United States Patent [19]
Goh

[11] Patent Number: 5,774,649
[45] Date of Patent: Jun. 30, 1998

[54] MICROPROCESSOR MALFUNCTION PREVENTION CIRCUIT

[75] Inventor: Young-ok Goh, Suwon, Rep. of Korea

[73] Assignee: SamSung Electronics Co., Ltd., Suwon, Rep. of Korea

[21] Appl. No.: 626,047

[22] Filed: Apr. 1, 1996

[30] Foreign Application Priority Data

Apr. 7, 1995 [KR] Rep. of Korea ......................... 95-8116

[51] Int. Cl.[6] .................................................. G06F 11/00
[52] U.S. Cl. ...................................... 395/185.08; 323/303
[58] Field of Search ........................ 395/185.08, 182.21, 395/184.01, 185.01; 371/61, 62; 364/580; 323/303

[56] References Cited

U.S. PATENT DOCUMENTS

| | | | |
|---|---|---|---|
| 4,512,019 | 4/1985 | Bodig et al. | 395/182.13 |
| 4,586,179 | 4/1986 | Sirazi et al. | 395/182.2 |
| 4,617,509 | 10/1986 | Tomisawa | 323/303 |
| 4,809,280 | 2/1989 | Shonaka | 395/185.08 |
| 4,811,200 | 3/1989 | Wagner et al. | 395/182.21 |
| 4,866,713 | 9/1989 | Worger et al. | 395/185.08 |
| 4,868,817 | 9/1989 | Shigihara | 395/184.01 |
| 4,903,193 | 2/1990 | Nakamura | 395/185.08 |
| 4,912,708 | 3/1990 | Wendt | 395/185.08 |
| 4,964,123 | 10/1990 | Umemoto | 395/185.08 |
| 5,123,018 | 6/1992 | Peterson | 395/185.08 |
| 5,327,362 | 7/1994 | Nomura | 364/580 |
| 5,345,583 | 9/1994 | Davis | 395/182.21 |
| 5,398,332 | 3/1995 | Komada et al. | 395/185.08 |
| 5,408,648 | 4/1995 | Gokan et al. | 395/182.21 |
| 5,563,799 | 10/1996 | Brehmer et al. | 364/481 |
| 5,576,650 | 11/1996 | Hirotani et al. | 327/142 |

*Primary Examiner*—Ly Hua
*Attorney, Agent, or Firm*—Robert E. Bushnell, Esq.

[57] ABSTRACT

A circuit for preventing malfunctions in a microprocessor or a central processing unit due to static electricity includes: malfunction detection circuitry for detecting a malfunction of the microprocessor from a predetermined signal generated from the microprocessor; a reset signal generator for generating a reset signal for resetting the microprocessor according to a malfunction detection signal generated from the malfunction detection circuitry; and reset summing circuitry for generating a synthesized reset signal by synthesizing the reset signal with a power reset signal, and resetting the microprocessor by providing the synthesized reset signal to the microprocessor.

20 Claims, 3 Drawing Sheets

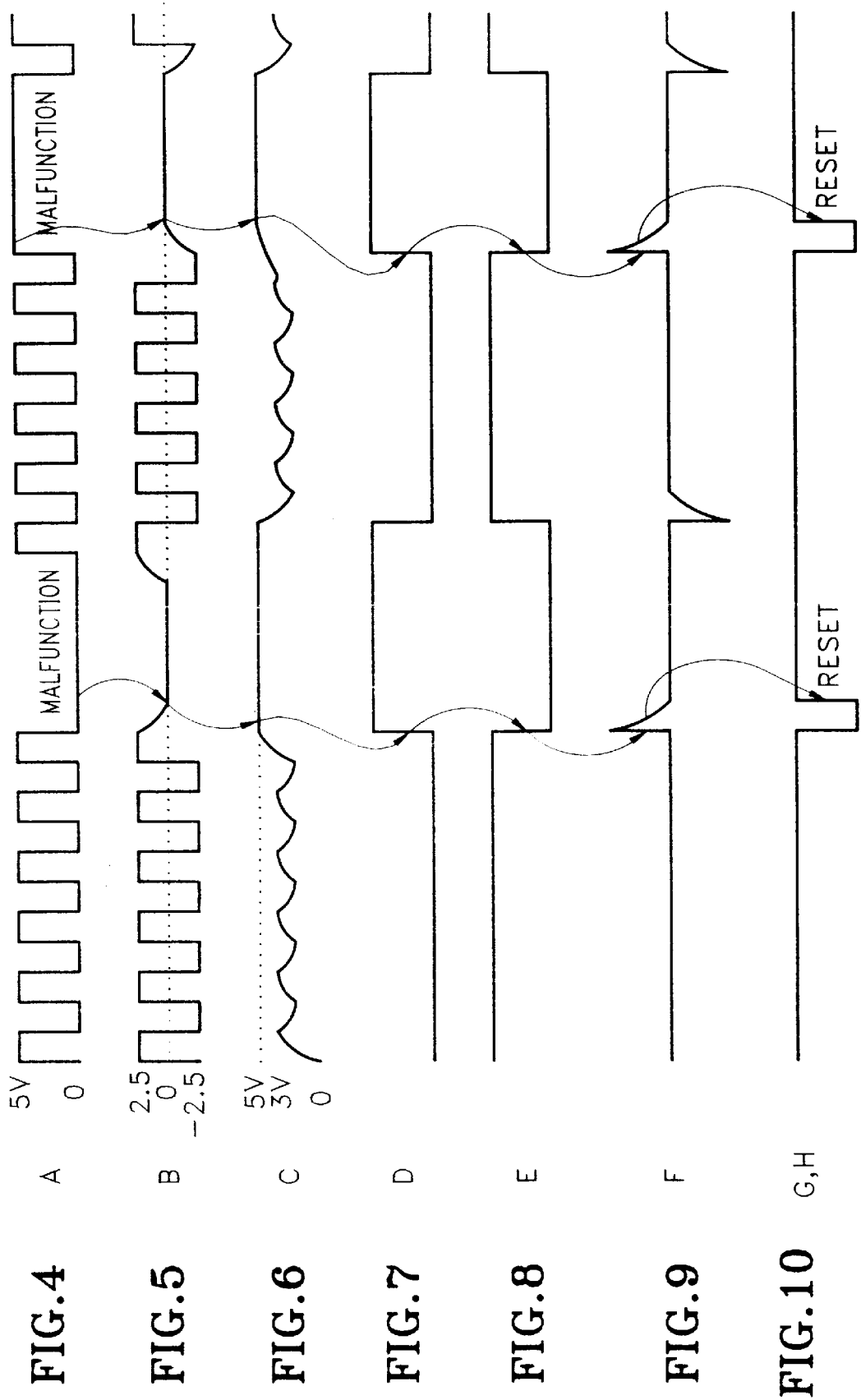

MICROPROCESSOR MALFUNCTION PREVENTION CIRCUIT

CROSS-REFERENCE TO RELATED APPLICATIONS

This application makes reference to, incorporates the same herein, and claims all benefits accruing under 35 U.S.C. §119 arising from an application for *Microprocessor Malfunction Prevention Circuit* earlier filed in the Korean Industrial Property Office on 9 Apr. 1995 and there duly assigned Serial No. 8116/1995.

BACKGROUND OF THE INVENTION

The present invention relates to a circuit for preventing the malfunction of a microprocessor, and more particularly, to a circuit for preventing the microprocessor or central processing unit (hereinafter, referred to as "a microprocessor") of various electronic equipment from malfunctioning due to static electricity.

Since a compact disk read only memory (a CD-ROM) drive uses external direct current power (+12 V and +5 V), malfunctions may occur due to unstable power in a personal computer (PC) or due to external power conditions. Microprocessor malfunctions often occur due to static electricity in electronic devices such as a laser disk player (LDP), a compact disk player (CDP) or a video cassette tape recorder (VCR), that is used while the microprocessor is exposed to ambient electrical conditions. Accordingly, I have noticed that there exists a need to prevent microprocessor malfunction in electronic devices.

One recent effort however, found in U.S. Pat. No. 5,398,332 entitled *System For Detecting The Malfunction Of A CPU Including A Watchdog Timer Circuit And A Memory For Storing A Malfunction Count* issued to Comedo et al. In Comedo et al. '332, simply connects a CPU to receive an interrupt signal in response to each detected malfunction of the CPU. A count value representative of the number of times the CPU has malfunctioned is stored in a non-volatile memory, and is incremented in response to each interrupt signal. When the count value stored in the non-volatile memory reaches a predetermined value, the CPU displays an alarm message on a display. While this type of conventional malfunction detection circuit provides a modicum of merit in its own right, it is limited to a specific application; moreover I believe that an improved process and circuit for preventing microprocessor malfunction can be contemplated.

SUMMARY OF THE INVENTION

Therefore, it is an object of the present invention to provide an improved process and circuit for preventing microprocessor malfunction.

It is another object to provide a process and circuit for preventing microprocessor malfunction by detecting the malfunction from an operating signal generated by the microprocessor.

It is still another object to provide a circuit for preventing microprocessor malfunction by selectively resetting the microprocessor.

It is yet another object to provide a circuit for resetting a microprocessor using a synthesized reset signal.

To achieve these and other objects, the present invention provides a circuit for resetting a microprocessor. This circuit may be constructed with a malfunction detector for detecting a malfunction of the microprocessor from a predetermined signal generated from the microprocessor; a reset signal generator for generating a reset signal for resetting the microprocessor according to a malfunction detection signal generated by the malfunction detector; and a reset summer for generating a synthesized reset signal by synthesizing the reset signal with a power reset signal, and resetting the microprocessor by providing the synthesized reset signal to the microprocessor. The malfunction detector is preferably constructed with a pair of cascaded complementary transistors and a capacitor for maintaining a constant voltage at a connection node between the transistors, the malfunction detection signal being represented as a voltage. The reset signal generator preferably has complementary first and second transistors connected to each other and a differentiator connected between an emitter terminal of the first transistor and a base terminal of the second transistor, with a predetermined voltage applied across the reset signal generator providing a rectangular voltage waveform output.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a hypothetical composite of a two coordinate graphical representation of a normal output waveform typically generated by a microprocessor, illustrating the waveforms of two different occurrences of malfunctions; and FIGS. 5 to 10 are two coordinate graphical representations illustrating the amplitudes of waveforms of signals at respective nodes of the malfunction prevention circuit shown in FIG. 3 in correspondence with the output waveform illustrated in FIG. 4 as a function of time.

DETAILED DESCRIPTION OF THE INVENTION

Figure 1:
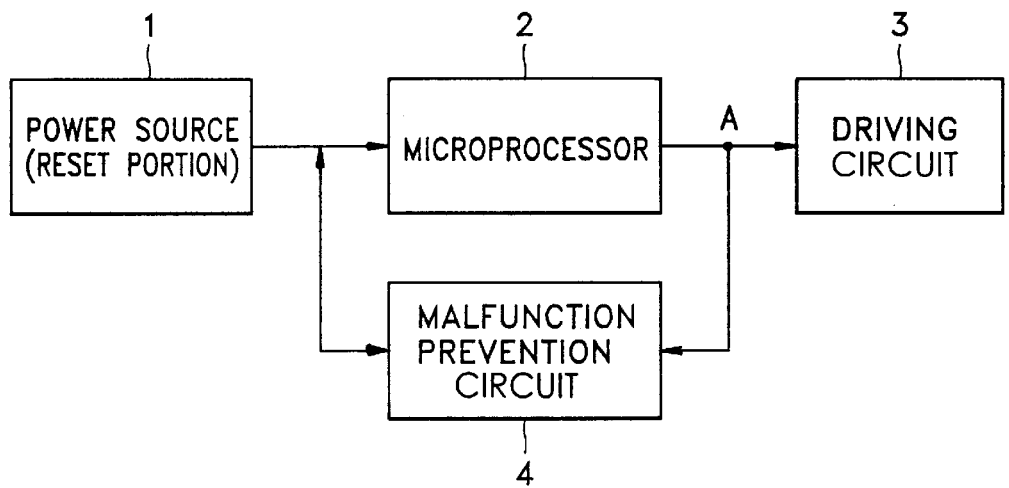
FIG. 1 is a block diagram schematically illustrating a circuit for preventing microprocessor malfunction according to the principles of the prevent invention.

Turning now to the drawings and referring to FIG. 1, a circuit for preventing microprocessor malfunctions according to the principles of the prevent invention is shown. The circuit of FIG. 1 is a feedback circuit, as indicated by a malfunction prevention circuit 4, which is connected to both ends of a microprocessor 2 for controlling a driving circuit 3 using power supplied from an external power source 1. The circuit detects malfunctions of microprocessor 2 attributable to unstable power or static electricity by monitoring an output waveform at node A generated from microprocessor 2. When an output waveform occurring at node A that is indicative of a malfunction is detected, a reset signal is generated. The reset signal is synthesized with a power reset signal provided from a reset portion of power source 1 to generate a synthesized reset signal. The malfunction is then prevented by resetting microprocessor 2 using the synthesized reset signal.

Figure 2:
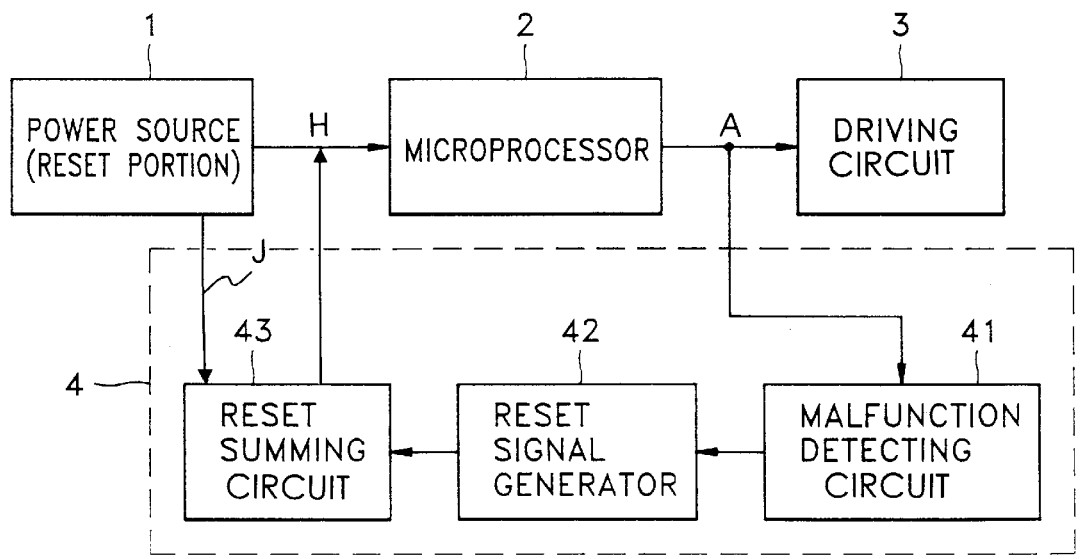
FIG. 2 is a more detailed schematic block diagram of the malfunction prevention circuit shown in FIG. 1.
Figure 3:
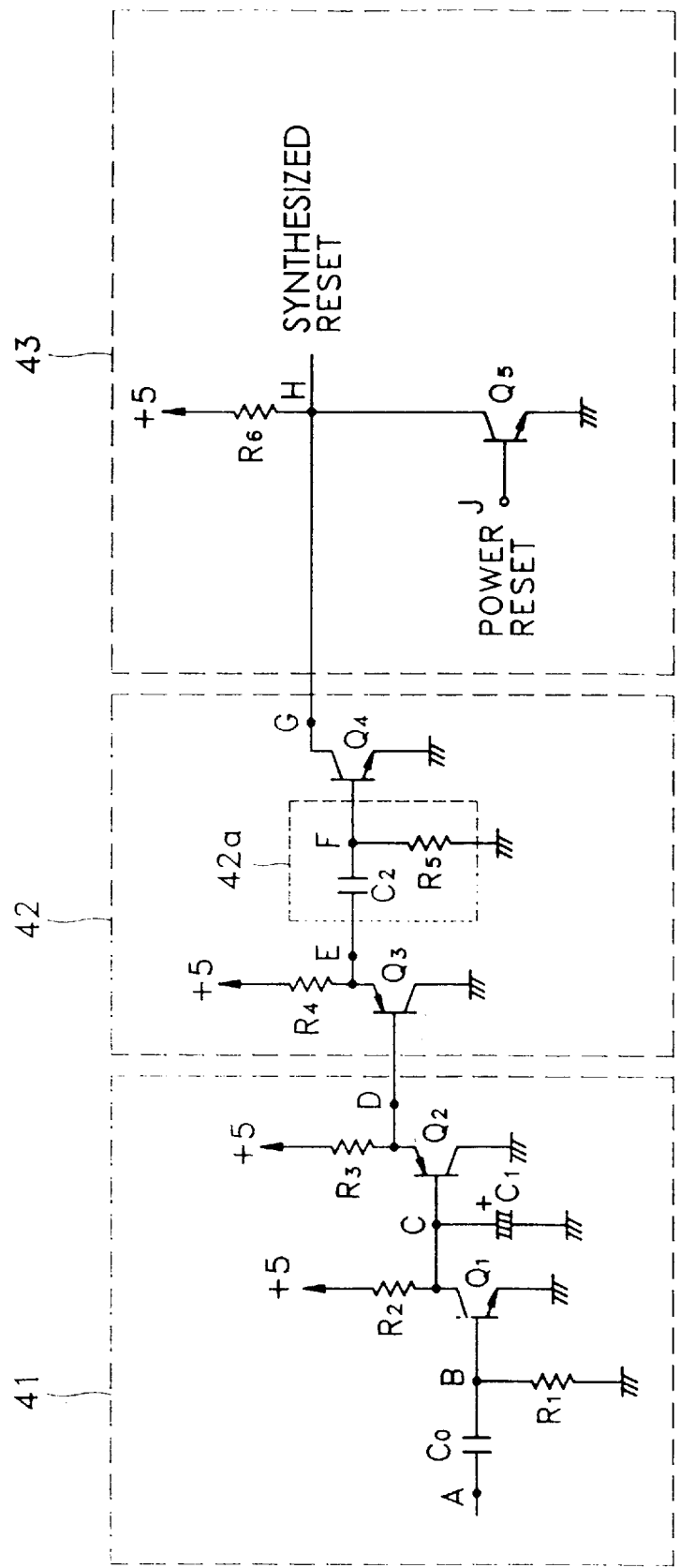
FIG. 3 is a detailed circuit diagram of those stages of the malfunction prevention circuit shown in FIG. 2.

The microprocessor malfunction prevention circuit constructed according to the principles of the present invention will now be described with reference to FIGS. 2 and 3. As shown in FIG. 2, malfunction prevention circuit 4 includes a malfunction detecting circuit 41, a reset signal generator 42 and a reset summing circuit 43. Malfunction detecting circuit 41, which includes a pair of complementary transistors $Q_1$ and $Q_2$ connected in a cascade form, as shown in FIG. 3, is for detecting a waveform indicating a malfunction from a predetermined operating waveform generated by microprocessor 2. An electrolytic capacitor $C_1$ providing constant voltage maintenance is connected to a connection node C between a collector of n-p-n bipolar transistor $Q_1$ and a base of p-n-p bipolar transistor $Q_2$. Also, a coupling capacitor $C_0$ is coupled between nodes A and B, a bias resistor $R_1$ is connected to a connection node B between coupling capacitor $C_0$ and a base of transistor $Q_1$, a collector resistor $R_2$ is coupled between node C at the collector of transistor $Q_1$ and a local power supply (e.g., at 5.0 volts), and an emitter resistor $R_3$ is coupled between node D at the emitter electrode of transistor $Q_2$ and the local power supply.

Reset signal generator 42, which includes a differentiator 42a connected between a pair of complementary bipolar transistors $Q_3$ and $Q_4$, is a circuit for generating a reset signal using the waveform indicative of a malfunction detected in malfunction detecting circuit 41. Differentiator 42a may be constructed with a capacitor $C_2$ connected between an emitter of the p-n-p transistor $Q_3$ and a base of the n-p-n transistor $Q_4$, and a resistor $R_5$ connected to a node F formed between one electrode of capacitor $C_2$ and the control, or base, electrode of transistor $Q_4$. Transistor $Q_3$ is provided with an emitter resistor $R_4$ coupled between its emitter electrode and the local power supply.

Malfunction detecting circuit 41 and reset signal generator 42 are electrically connected to each other at a connection node D between an emitter electrode of transistor $Q_2$ and a base electrode of transistor $Q_3$. Reset summing circuit 43, which includes a n-p-n transistor $Q_5$ with its principal electrically conducting channel electrodes coupled between node H and a local reference potential, and a resistor $R_6$ coupled between the local power supply and node H formed between the collector electrode of transistor $Q_4$ and the collector electrode of transistor $Q_5$, synthesizes the reset signal generated from reset signal generator 42 with the reset signal supplied from the reset portion of power source 1. Reset signal generator 42 and reset summing circuit 43 are electrically connected to each other between a collector electrode of transistor $Q_4$ and a collector electrode of transistor $Q_5$ at nodes G and H.

The operation of the microprocessor malfunction prevention circuit constructed as shown in FIG. 3 will now be described with reference to FIGS. 4 to 10. First, referring to the hypothetical composite waveform shown in FIG. 4, the occurrence of a malfunction is represented by a continuous constant amplitude signal instead of the information bearing binary signal. For ease of understanding, FIG. 4 is drawn as a composite of a normal binary waveform bearing information representing alternating logical states, interrupted by malfunction waveform components that have a constant amplitude over the duration of the malfunction. When a malfunction waveform component such as a duration of the waveform occurring at node A exhibiting a continuous low logic level or alternatively, exhibiting a high logic level as are both separately illustrated in FIG. 4, is received by malfunction detecting circuit 41 from microprocessor 2 via node A, the continuous malfunction waveform component is clamped down by capacitor $C_0$, converted into a waveform at node B shown in FIG. 5, and then provided to the base of transistor $Q_1$ via node B. Since transistor $Q_1$ is switched on and off according to the amplitude of the waveform applied to the base of transistor $Q_1$, a rectangular wave of a high voltage level is formed at node C, as shown in FIG. 6, due to the effect of electrolytic capacitor $C_1$ endeavoring to maintain a constant voltage. This maintenance of a constant voltage is in contradistinction to the fluctuating ripple waveform that occurs during normal operation of microprocessor 2.

In the waveform shown in FIG. 6, there is a potential difference of about two volts between a ripple waveform voltage of about three volts and an open collector voltage of transistor $Q_2$ of about five volts, to thereby turn on transistor $Q_2$. Thus, as shown in FIG. 7, the voltage at node D is approximately equal to a ground potential of zero volts. Since a base bias voltage is not supplied to the base electrode of transistor $Q_2$ in the form of the rectangular wave due to the presence of the malfunction output wave, transistor $Q_2$ is turned off and a continuous rectangular wave at a high voltage level of about five volts appears at node D, as is shown in FIG. 7, in correspondence with the initial occurrence of the malfunction component of the waveform at node A generated by microprocessor 2. The rectangular malfunction wave at node D is phase-inverted by transistor $Q_3$ into a rectangular wave, as shown in FIG. 8, at node E. The rectangular wave due to the malfunction is converted into a sharp differential pulse, as shown in FIG. 9, while passing differentiator 42a and being applied to the base of transistor $Q_4$. In response to the occurrence of the differential wave, the reset signal is generated by transistor $Q_4$. Here, since a downward differential wave does not apply a bias voltage to transistor $Q_4$, transistor $Q_4$ maintains its principal electrically conducting channel between its collector and emitter electrodes in an electrically non-conducting off-state. Thus, as shown in FIG. 10, the reset signal is generated at node G with respect to only an upward differential wave. The reset signal generated by the malfunction of the microprocessor is applied to node H, and then, is synthesized with the power reset signal provided to a base of transistor $Q_5$ from the reset portion of power source 1, so as to generate the synthesized reset signal. The synthesized reset signal is applied to microprocessor 2 to perform resetting.

As described above, the microprocessor malfunction preventing circuit, when constructed according to the principles of the present invention, detects the malfunction of the microprocessor from a predetermined malfunction waveform output by the microprocessor and generates the reset signal. Then, a synthesized reset signal is generated by synthesizing the reset signal generated due to the malfunction with the power reset signal. The microprocessor is reset in response to application of the synthesized reset signal. Accordingly, the malfunction used in the microprocessors of various electrical devices can be prevented in advance.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for resetting a microprocessor, comprising:

a coupling capacitor providing an input terminal for receiving binary signals generated by said microprocessor;

a first transistor having a control electrode separated from said input terminal by said capacitor, said control electrode of said first transistor being electrically coupled to a second terminal provided by said coupling capacitor, and electrodes of a principal electrically conducting channel coupled between reference potentials of different magnitude;

a second transistor complementary to and coupled in electrical cascade with said first transistor, said second transistor having a control electrode forming a first node coupled to a first one of said electrodes of said principal electrically conducting channel of said first transistor, said second transistor having electrodes of a principal electrically conducting channel coupled between said reference potentials;

a second capacitor coupled between said first node and one of said reference potentials;

reset signal generation means coupled to a second node formed with a first one of said electrodes of said principal electrically conducting channel of said second transistor for generating an initial reset signal for resetting said microprocessor in response to a malfunction detection signal occurring at said second node in response to said binary signals continuously exhibiting a single voltage representing an occurrence of malfunction by said microprocessor; and reset summing means for generating a synthesized reset signal by synthesizing said initial reset signal with a power reset signal, and resetting said microprocessor by providing said synthesized reset signal to said microprocessor.

2. The circuit as claimed in claim 1, wherein said reset summing means comprises a transistor having a base terminal for receiving said power reset signal.

3. The circuit of claim 1, with s. reset signal generation means comprises:

a third transistor having a control electrode electrically coupled to said second mode and electrodes of a principal electrically conducting channel coupled between said reference potentials, with a first one of s. electrodes of s. principal electrically conducting channel of s. third transistor forming a third node;

a fourth transistor complementary to said third transistor, said fourth transistor having a control electrode forming a fourth node and electrodes of a principal electrically conducting channel coupled between said reference potentials, with a first one of s. electrodes of s. principal electrically conducting channel of s. fourth transistor forming a fourth node; and a differentiator coupled between said third node and s. fourth node.

4. The circuit of claim 3, with said reset summing means comprising a fifth transistor having a control electrode disposed to operationally respond to said power reset signal and electrodes of a principal electrically conducting channel coupled between said reference potential with a first one of s. electrodes of s. principal electrically conducting channel of s. fifth transistor being coupled to s. fourth node.

5. The circuit of claim 1, with said reset summing means comprising a third transistor having a control electrode coupled to operationally respond to said power reset signal and electrodes of a principal electrically conducting channel coupled between said reference potential.

6. A circuit, for resetting a microprocessor, comprising:

malfunction detection means for detecting occurrence of a malfunction of said microprocessor on the basis of a binary signal generated by said microprocessor:

reset signal generation means for generating a reset signal for resetting said microprocessor in response to a malfunction detection signal generated from said malfunction detection means, and reset summing means for generating a synthesized reset signal by synthesizing said reset signal with a power reset signal, and resetting said microprocessor by providing said synthesized reset signal to said microprocessor;

said malfunction detection means comprising:

a pair of cascaded complementary transistors; and a capacitor for maintaining constant voltage at a connection node between said transistors, said malfunction detection signal being represented as a voltage.

7. The circuit as claimed in claim 6, wherein said reset signal generation means comprises:

complementary first and second transistors connected to each other; and a differentiator connected between an emitter terminal of said first transistor and a base terminal of said second transistor, wherein a predetermined voltage passes through said reset signal generation means for output in a rectangular voltage waveform.

8. The circuit as claimed in claim 7, wherein said differentiator comprises a capacitor and a resistor.

9. A circuit for resetting a microprocessor, comprising:

malfunction detecting means for detecting a malfunction of said microprocessor from a predetermined signal generated from said microprocessor, said malfunction detecting means comprising:

an input terminal for receiving said predetermined signal from said microprocessor;

first and second transistors forming a first conduction path between a collector terminal of said first transistor and a base terminal of said second transistor;

a coupling capacitor electrically connected between said input terminal and a base terminal of said first transistor;

an electrolytic capacitor electrically connected between a ground potential and a connecting node positioned along said first conduction path between said first and second transistors; and a first output terminal electrically connected to an emitter terminal of said second transistor for providing output of a malfunction detection signal;

reset signal generating means for generating a reset signal for resetting said microprocessor according to said malfunction detection signal generated from said malfunction detecting means, said reset signal generating means comprising:

third and fourth transistors forming a second conduction path between an emitter terminal of said third transistor and a base terminal of said fourth transistor, said third transistor having a base terminal electrically connected to said first output terminal of said malfunction detecting means;

a differentiator interposed along said second conduction path between said third and fourth transistors; and a second output terminal electrically connected to a collector terminal of said fourth transistor for providing output of said reset signal; and reset summing means for receiving said reset signal from said second output terminal of said reset signal generating means, generating a synthesized reset signal by synthesizing said reset signal with a power reset signal, and resetting said microprocessor by providing said synthesized reset signal to said microprocessor.

10. The circuit as claimed in claim 9, wherein said reset summing means comprises a fifth transistor having a base terminal for receiving said power reset signal.

11. The circuit as claimed in claim 9, wherein said differentiator comprises a capacitor and a resistor.

12. The circuit as claimed in claim 9, wherein said first and fourth transistors comprise n-p-n transistors.

13. The circuit as claimed in claim 12, wherein said second and third transistors comprise p-n-p transistors.

14. The circuit as claimed in claim 13, wherein said reset summing means comprises a fifth transistor having a base terminal for receiving said power reset signal.

15. The circuit as claimed in claim 14, wherein said differentiator comprises a capacitor and a resistor.

16. The circuit as claimed in claim 9, wherein said second and third transistors comprise p-n-p transistors.

17. A circuit for controlling a microprocessor, comprising:

malfunction detecting means for detecting a malfunction of said microprocessor from a predetermined signal generated from said microprocessor, said malfunction detecting means comprising:

an input terminal for receiving said predetermined signal from said microprocessor;

first and second transistors forming a first conduction path between a collector terminal of said first transistor and a base terminal of said second transistor;

a first capacitor electrically connected between a ground potential and a connecting node positioned along said first conduction path between said first and second transistors; and a first output terminal electrically connected to an emitter terminal of said second transistor for providing output of a malfunction detection signal;

reset signal generating means for generating a reset signal for resetting said microprocessor according to said malfunction detection signal generated from said malfunction detecting means, said reset signal generating means comprising:

third and fourth transistors forming a second conduction path between an emitter terminal of said third transistor and a base terminal of said fourth transistor, said third transistor having a base terminal electrically connected to said first output terminal of said malfunction detecting means;

a second capacitor electrically connected along said second conduction path between said third and fourth transistors; and a second output terminal electrically connected to a collector terminal of said fourth transistor for providing output of said reset signal; and reset summing means for receiving said reset signal from said second output terminal of said reset signal generating means, generating a synthesized reset signal by synthesizing said reset signal with a power reset signal, and resetting said microprocessor by providing said synthesized reset signal to said microprocessor.

18. The circuit as claimed in claim 17, wherein said reset summing means comprises a fifth transistor having a base terminal for receiving said power reset signal.

19. The circuit as claimed in claim 17, wherein said first and fourth transistors comprise n-p-n transistors.

20. The circuit as claimed in claim 19, wherein said second and third transistors comprise p-n-p transistors.

* * * * *